A. M. Wilson,
Mower.

No. 4,734.  Patented Sep. 3, 1846

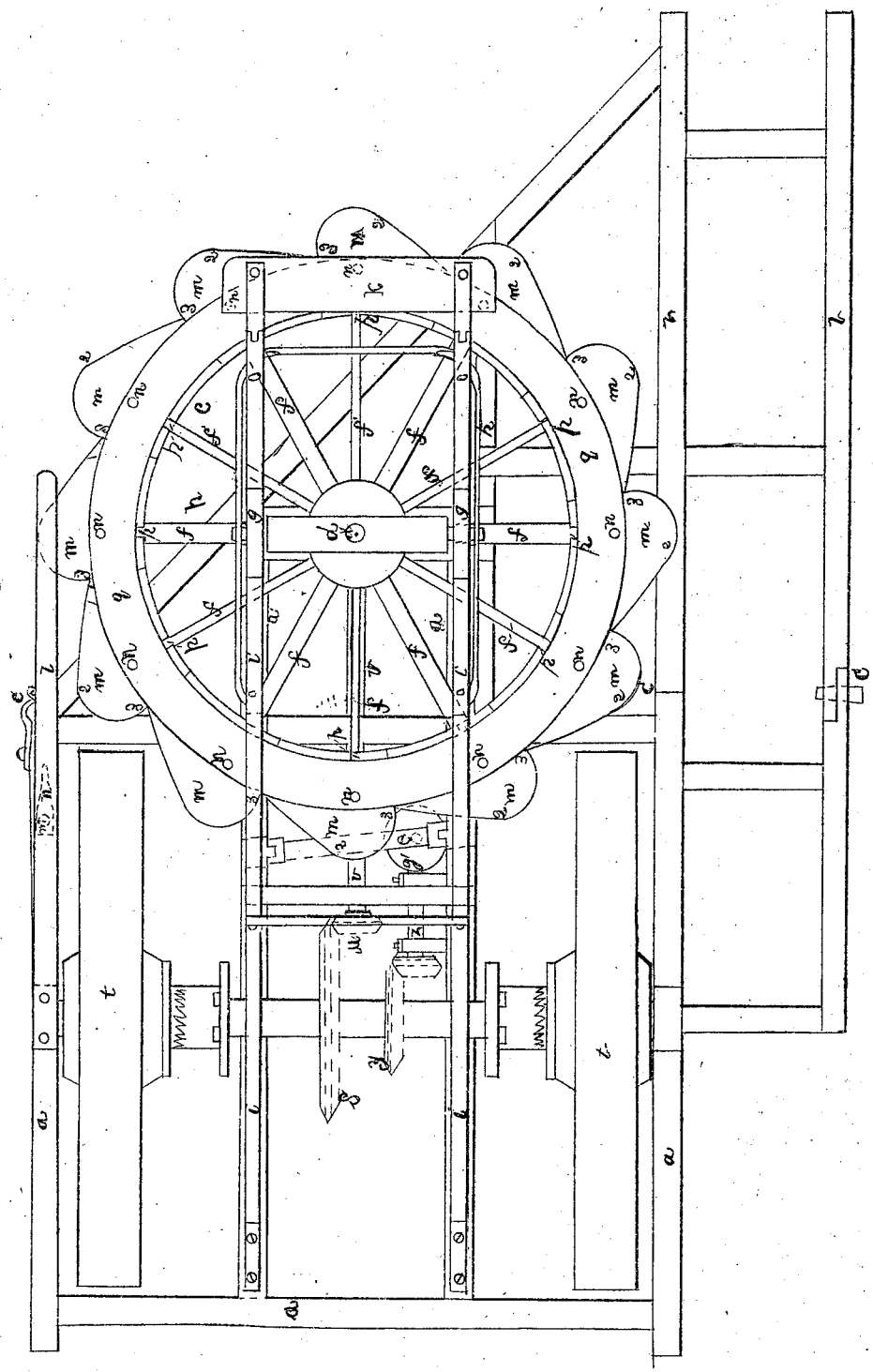

UNITED STATES PATENT OFFICE.

ALEXANDER M. WILSON, OF NEW YORK, N. Y.

IMPROVEMENT IN MOWING-MACHINES.

Specification forming part of Letters Patent No. 4,734, dated September 3, 1846.

*To all whom it may concern:*

Be it known that I, ALEXANDER M. WILSON, of New York, in the county of New York and State of New York, have invented new and useful Improvements in the Machine for Mowing and Reaping Grain, Grass, &c.; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1:
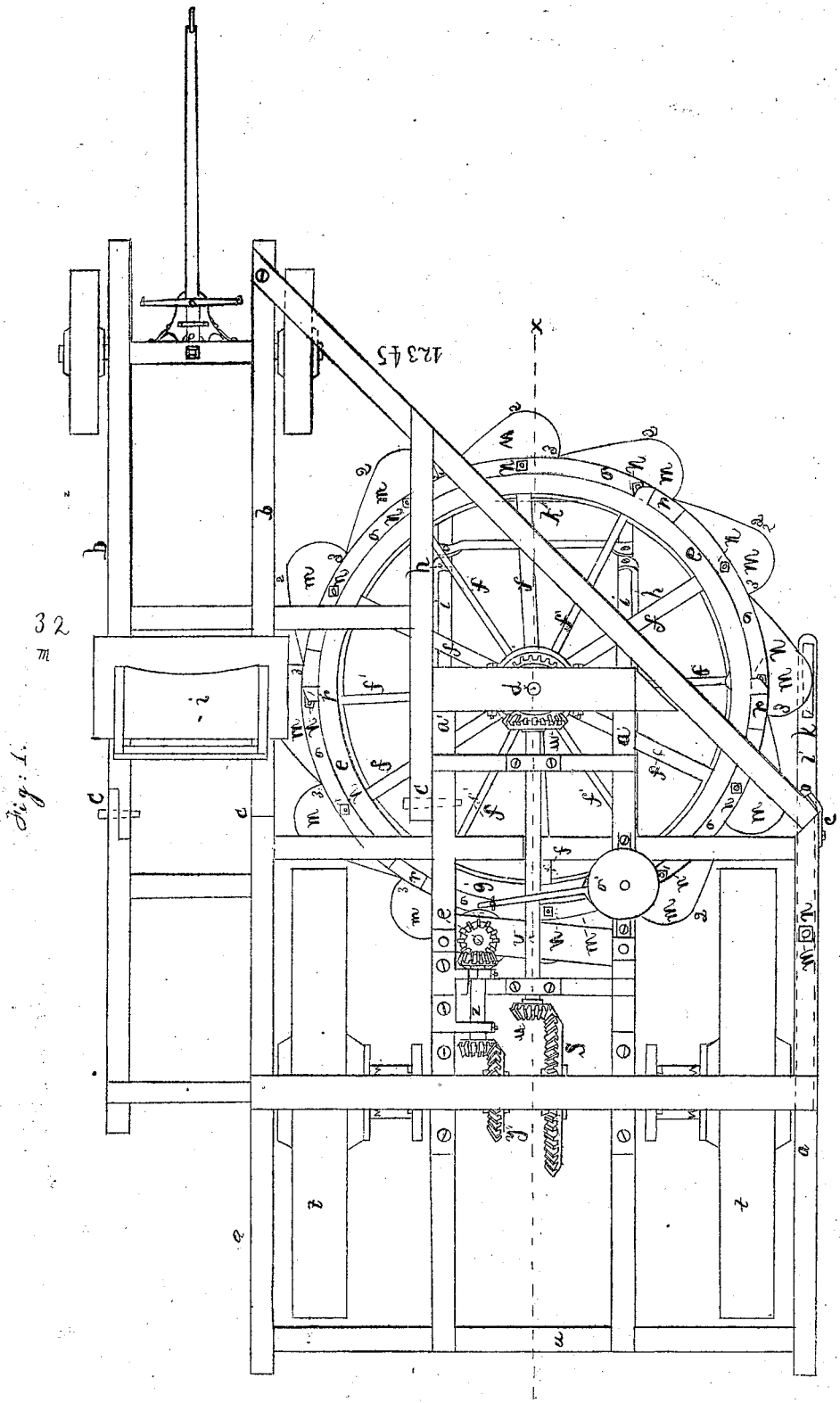
Figure 2:
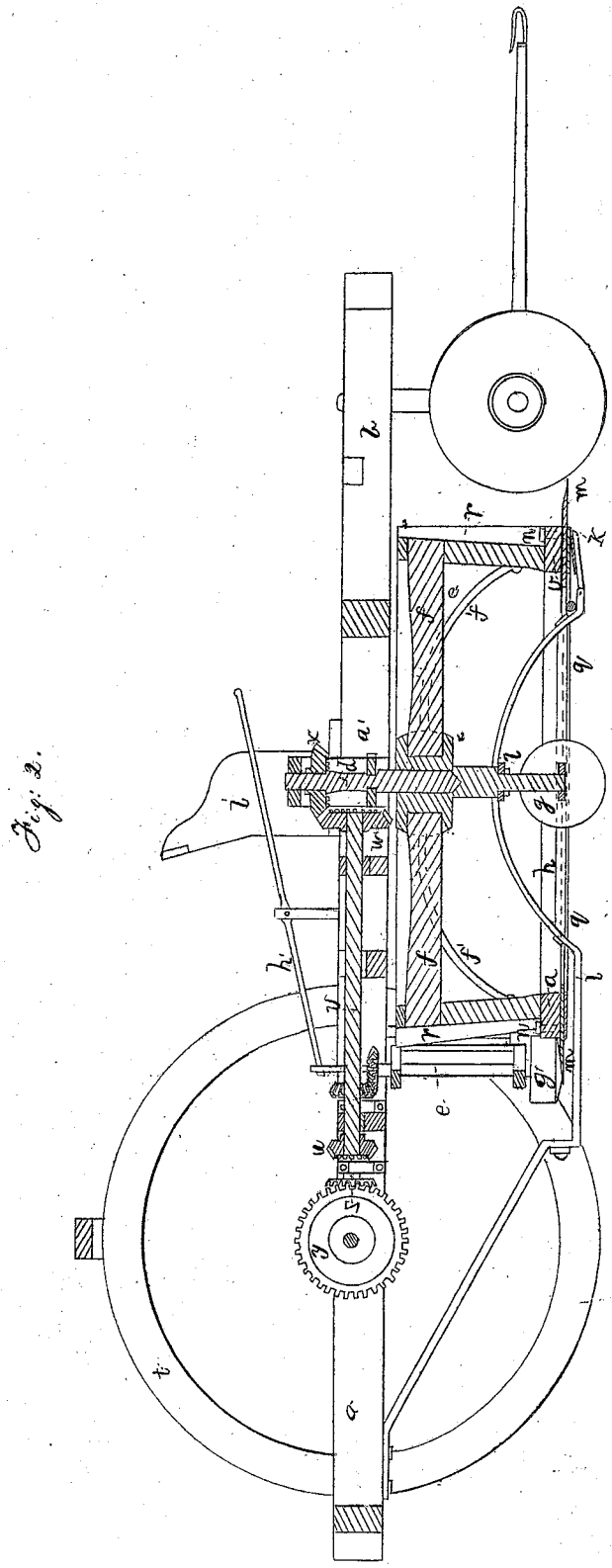

Figure 1 is a plan of the machine; Fig. 2, a longitudinal vertical section taken at the line X X of Fig. 1; and Fig. 3, a view of the bottom of the machine.

The same letters indicate like parts in all the figures.

In the machine secured to me by Letters Patent, bearing date the 15th day of May, in the year 1837, for improvements on a machine previously secured to me by Letters Patent, the 10th day of June, in the year 1835, the grain or grass is cut by means of cutters attached to the lower end of the drum of the gathering-wheel, their cutting-edges forming segments of circles eccentric to the wheel, the heel of each cutter being at the greatest distance from the center of the said gathering-wheel, so as to leave an offset between the heel of each cutter and the forward part of the succeeding ones, so that in rotating, as the whole machine is moved forward, there is a portion of each cutter that does not cut in consequence of the offset between the heel of one and the forward part of the next cutter, thus losing time and cutting-surface, and at the same time leaving too great an accumulation of grass or grain for the effective part of the cutters to act on. The machine is moved forward by horses placed behind, and therefore the cutting and gathering wheel has to be so connected with the main frame as to admit of rising and falling to adapt itself to the inequalities of the surface of the ground. This part of the operation is necessarily defective, as the cutters cannot follow the curves of the undulations of the earth's surface with facility, for the push of the horses tends to force the forward part of the machine into the ground. The runners are used to guide the cutters; but these occasion much loss of power, and wheels cannot be introduced from the very structure of the wheel, which will not admit them within, and they cannot of course be placed outside for various obvious reasons, such as passing over and mashing down the grain or grass. The grinding of the knives is effected by their passage in their rotation over a permanent grinder, which does not, however, give the required edge or effectually sharpen them.

The object of the improvements which I now desire to secure by Letters Patent is to remedy these defects, which is effectually accomplished.

They consist, first, in making the cutting-edges of the cutters of a more gradual curve, and rounding off the heel, so as to continue cutting as the machine passes to the uncut grain or grass, to avoid throwing too much work on the heel part of the cutters, and at the same time to bring into action a greater extent of cutting-surface for a given size of wheel than could possibly be attained by the previous mode; secondly, the cutting and gathering wheel has its bearings in the main frame of the machine, and the horses are harnessed to a frame, which is jointed to the forward part of the main frame but back of the center of the cutting-wheel, and extending diagonally to the side, so that the horses walk in the swath previously cut and pass over the irregularities of the surface, leaving the cutters free to follow the undulating surface; thirdly, I connect the drum of the cutting and gathering wheel to its shaft by means of curved or dished arms, and bend the runners up within the drum to receive guide-wheels to adapt the cutters to the inequalities of the surface of the ground, instead of relying entirely on the friction of the runners; and, fourthly, I grind the upper beveled edges of the cutters by means of a horizontal rotating grinder, the under surface of which is beveled to the inclination of the beveled faces of the cutters, and combine this with a permanent grinder, over which the cutters pass to remove the wire edges produced by the rotating grinder.

In the accompanying drawings, *a* represents the main frame of the machine, and *b* the horse-frame, jointed to it at *c c c c*, the part *a'* of the main frame projecting into and forward of the joints of the horse-frame to receive the bearings of the shaft $d$, which carries the drum of the gathering-wheel $e$ by means of two sets of arms, $f\ f'$, the upper set, $f$, being straight, and the others, $f'$, extending from near the top of the hub in a curve to within a short distance of the lower edge of the drum, so as to admit the guide-wheels $g\ g$ to run within it. These guide-wheels have their bearings in two bars, $h\ h$, attached to the runners $i\ i$, that are attached to the back of the frame, bent up within the drum to pass over the wheels, and then down to pass under the cutters, their forward ends being connected together by a bar, $k$, jointed to them, so as to bear up under the cutters. Above the guide-wheels they are also connected together by a bar, $l$, that forms the lower step of the shaft $d$ of the cutting and gathering wheel.

The cutters $m$ are secured to the lower edge of the drum of the gathering-wheel by means of screw-bolts $n$, that pass through the flange $o$ of the drum, through a slot in the cutters, and then through an annular plate, $q$, below, (see Fig. 2,) so that by loosening these bolts the cutters can be removed and set at pleasure. The form of each cutter is fully represented in the drawings, where it will be seen that from the point 1 to 2 it is nearly straight, and from 2 to 3, where it joins the point 1 of the next cutter, it forms a half-circle, or nearly so. The periphery of the drum is armed with projecting ribs $r$, extending from the flange $o$ to the upper edge and inclining upward in the direction of the rotation, so as to carry the grain to the side of the machine and lay it properly on the ground. This wheel is driven by a bevel-wheel, $s$, on the shaft or axle of the running-wheels $t\ t$, (as in my previously-patented machine,) which drives by a bevel-pinion, $u$, on one end of a horizontal shaft, $v$, the other end of which has a bevel-wheel, $w$, that drives a bevel-wheel, $x$, on the upper end of the shaft of the gathering-wheel. On the same shaft or axle of the running-wheels $t\ t$ there is another beveled wheel, $y$, that drives another horizontal shaft, $z$, which communicates motion in like manner to the vertical shaft $e'$ of the grinding-wheel $g'$, the under face of which is beveled to correspond with the bevel which forms the cutting-edge of the cutters, so that the cutters are ground by their own motion and that of the grinding-wheel. The shaft of this grinding-wheel has its bearings in a sliding frame operated by a lever, $h'$, which extends to the seat $i'$ of the driver, so that he can throw it in and out of gear at pleasure. After passing under and having their upper faces ground by the rotary grinder, for the purpose of grinding the under face to remove the wire edge, the cutters in their rotation pass over another permanent grinder, $k'$, attached to the end of a spring, $l'$, provided with a regulating screw-rod, $m'$, and nuts $n'\ n'$, by which the pressure can be regulated. A water-vessel, $o'$, can be placed on the frame, with a spout to drop water on the grinding-wheels and cutters.

Instead of the sliding frame and lever, other known means of lifting the grinding-wheel from the face of the cutters may be substituted.

What I claim as my invention, and desire to secure by Letters Patent, is—

1. Making the heel of the cutters rounded when a number of cutters are combined together on a wheel to cut grass or grain by the rotation and forward movement of the machine, as herein described.

2. Jointing the horse-frame to the forward part of the main frame, but back of the shaft of the cutting-wheel, so as to have the horses placed forward and to the side of the cutters, in combination with a wheel of cutters for cutting grain or grass, so that the cutters may follow the undulation of the ground independent of and not affected by the up-and-down movement of the horse, as herein described.

3. The employment of the guide-wheels, in combination with the cutting and gathering wheel, connected with its shaft by means of curved or dished arms, as herein described.

4. In combination with the curved cutters, attached to and forming the cutting-wheel, the rotating grinding-wheel for grinding the upper beveled face of the cutters, as described.

5. In combination with this, the grinder, for grinding the under surface of the cutters, as described.

ALEX. M. WILSON.

Witnesses:
 JOHN M. MAY,
 ALEX. P. BROWNE.